United States Patent [19]

Pyzik

[11] Patent Number: 5,120,328
[45] Date of Patent: Jun. 9, 1992

[54] DENSE, SELF-REINFORCED SILICON NITRIDE CERAMIC PREPARED BY PRESSURELESS OR LOW PRESSURE GAS SINTERING

[75] Inventor: Aleksander J. Pyzik, Midland, Mich.

[73] Assignee: The Dow Chemical Company, Midland, Mich.

[21] Appl. No.: 657,715

[22] Filed: Feb. 19, 1991

Related U.S. Application Data

[63] Continuation-in-part of Ser. No. 572,823, Aug. 24, 1990, which is a continuation-in-part of Ser. No. 398,801, Aug. 25, 1989, Pat. No. 5,021,372, which is a continuation-in-part of Ser. No. 297,627, Jan. 13, 1989, abandoned, which is a continuation-in-part of Ser. No. 148,748, Jan. 27, 1988, Pat. No. 4,883,776.

[51] Int. Cl.$^5$ .............................................. C04B 35/58
[52] U.S. Cl. ........................................ 51/309; 501/95; 501/97; 501/98; 264/65
[58] Field of Search ............... 501/97, 98, 95; 264/65; 51/309

[56] References Cited

U.S. PATENT DOCUMENTS

| | | | |
|---|---|---|---|
| 3,950,464 | 4/1976 | Masaki | 264/65 |
| 4,004,937 | 1/1977 | Masaki | 106/59 |
| 4,025,351 | 5/1977 | Masaki | 106/59 |
| 4,046,580 | 9/1977 | Ishii et al. | 106/55 |
| 4,097,293 | 6/1978 | Komeya et al. | 106/43 |
| 4,119,689 | 10/1978 | Prochazka et al. | 264/65 |
| 4,179,301 | 12/1979 | Buljan | 106/73.5 |
| 4,218,257 | 8/1980 | Oda et al. | 106/73.5 |
| 4,227,842 | 10/1980 | Samanta et al. | 409/131 |
| 4,279,657 | 7/1981 | Greskovich | 106/73.5 |
| 4,296,065 | 10/1981 | Ishii et al. | 264/325 |
| 4,323,325 | 4/1982 | Samanta et al. | 409/131 |
| 4,406,668 | 9/1983 | Sarin et al. | 51/295 |
| 4,407,970 | 10/1983 | Komatsu et al. | 501/97 |
| 4,511,402 | 4/1985 | Miura et al. | 75/233 |
| 4,511,525 | 4/1985 | Tsuge et al. | 264/65 |
| 4,543,345 | 9/1985 | Wei et al. | 501/95 |
| 4,603,116 | 7/1986 | Smith et al. | 501/97 |
| 4,609,633 | 9/1986 | Fukuhara et al. | 501/97 |
| 4,622,186 | 11/1986 | Mizutani | 264/62 |
| 4,652,276 | 3/1987 | Burden | 51/308 |
| 4,699,890 | 10/1987 | Matsui | 501/98 |
| 4,717,693 | 1/1988 | Wittmer | 501/97 |
| 4,734,234 | 3/1988 | Sterzel | 264/66 |
| 4,753,764 | 4/1988 | Kamijo | 264/63 |
| 4,801,565 | 1/1989 | Matsui | 501/97 X |
| 4,820,665 | 4/1989 | Ukai et al. | 501/97 |
| 4,870,036 | 9/1989 | Yeh | 501/97 |
| 4,891,342 | 1/1990 | Yokoyama | 501/97 |
| 4,920,085 | 4/1990 | Yoshida et al. | 501/97 |
| 4,923,829 | 5/1990 | Yasutomi et al. | 501/95 |
| 5,002,907 | 3/1991 | Hayakawa et al. | 510/97 |
| 5,015,608 | 5/1991 | Matsuhisa et al. | 501/97 |
| 5,017,531 | 5/1991 | Ukai et al. | 501/98 |

FOREIGN PATENT DOCUMENTS

| | | | |
|---|---|---|---|
| 0100380 | 7/1982 | European Pat. Off. | 35/58 |
| 0079678 | 5/1983 | European Pat. Off. | 35/58 |
| 0228022 | 7/1987 | European Pat. Off. | 35/58 |
| 8908625 | 3/1989 | European Pat. Off. | 35/58 |
| 58-64274 | 4/1983 | Japan | 35/58 |
| 59-21413 | 2/1984 | Japan | 27/2 |
| 61-78657 | 4/1986 | Japan | 3/10 |
| 0106430 | 5/1986 | Japan | 9/48 |
| 61-97167 | 7/1986 | Japan | |

OTHER PUBLICATIONS

Chemical Abstract 97:132331w (1982).
Derwent 86:165122/26.
Derwent 87:098199/14.
Crystallization of Y-Al-Garnet in Pressureless Sintered β-Sialon Materials, Greil et al.
Akihiko Tsuge et al., Journal of The Americal Ceramics Society, 58, 323-326 (1975).
Osami Abe, Ceramics International, 53-60, (1989).

*Primary Examiner*—Karl Group

[57] ABSTRACT

A dense, self-reinforced silicon nitride ceramic prepared by pressureless sintering or low pressure gas sintering. The composition comprises (a) silicon nitride, at least 20 percent of which is in the form of β-silicon nitride whiskers having a high average aspect ratio, (b) from about 2 to about 10 weight percent of a glassy grain boundary phase containing magnesium oxide, yttrium oxide, silica, zirconia, and optionally, one oxide selected from the group consisting of calcium, gallium, indium and hafnium oxides, and (c) a second crystalline phase in an amount ranging from 0.5 to about 5.0 weight percent comprising zirconium oxide, and (d) optionally, crystalline phases of metal zirconium silicide and/or metal zirconium silicon nitride in a combined amount from 0.1 to 3.0 weight percent, wherein the metal is tantalum, calcium, hafnium, gallium or indium, and wherein when the metal is calcium, hafnium, gallium or indium, the same metal occurs as the metal oxide in the glassy phase. The ceramic exhibits high fracture toughness and high fracture strength and has a density of at least 98 percent of theoretical.

28 Claims, No Drawings

DENSE, SELF-REINFORCED SILICON NITRIDE CERAMIC PREPARED BY PRESSURELESS OR LOW PRESSURE GAS SINTERING

CROSS-REFERENCE TO RELATED APPLICATION

This application is a continuation-in-part of co-pending application Ser. No. 07/572,823, filed Aug. 24, 1990, which is a continuation-in-part of copending application Ser. No. 07/398,801, filed Aug. 25, 1989, U.S. Pat. No. 5,021,372 which is a continuation-in-part of application Ser. No. 07/297,627, filed Jan. 13, 1989, now abandoned, which is a continuation-in-part of application Ser. No. 07/148,748, filed Jan. 27, 1988, now U.S. Pat. No. 4,883,776.

BACKGROUND OF THE INVENTION

This invention pertains to a silicon nitride ($Si_3N_4$) ceramic body and a process for preparing the same.

Silicon nitride ceramics are recognized for their excellent mechanical and physical properties, including good wear resistance, low coefficient of thermal expansion, good thermal shock resistance, high creep resistance and high electrical resistivity. In addition, silicon nitride ceramics are resistant to chemical attack, particularly to oxidation. Because of these attributes, silicon nitride is useful in a variety of wear and high temperature applications, such as cutting tools and parts in pumps and engines.

Typically, the densification of silicon nitride requires the presence of densification aids, such as MgO, $Y_2O_3$, $Al_2O_3$, $CeO_2$, $SiO_2$, and $ZrO_2$. A powder mixture is usually prepared comprising silicon nitride and one or more of such densification aids and heated under conditions described hereinafter. The densification aids form a liquid phase into which the silicon nitride is dissolved. Thereafter the dissolved silicon nitride coalesces to form a densified silicon nitride body.

Typically, the densification of the aforementioned powder mixture is carried out by one of four general methods: hot pressing (HP), hot isostatic pressing (HIP), pressureless sintering, or low pressure gas sintering. Hot pressing involves the simultaneous application of heat and mechanical pressure to the powder mixture at temperatures high enough to cause densification. Typical hot pressing conditions include a nitrogen atmosphere, a temperature in the range from about 1650° C. to about 1900° C., and a pressure in the range from about 2000 psig to about 5,000 psig. The pressure is usually applied to the powder mixture by means of a uniaxial ram press.

In the hot isostatic pressing method, the powder mixture is placed in a non-permeable, deformable container to which heat and pressure are applied. In this method pressure in the range from about 10,000 psig to about 30,000 psig is applied equally to all faces of the powder compact, usually by means of a pressurized gas. The temperature of this method typically ranges from about 1800° C. to about 2100° C.

Pressureless sintering generally connotes a process of thermally densifying pre-pressed powder compacts without the use of a container for the compact and without the external application of high pressure to the compact. Thus, the powder mixture is pre-pressed into the desired near net shape and then heated to a high temperature, typically in the range from about 1650° C. to about 1800° C. under a flow of inert gas, such as nitrogen, at one atmosphere pressure. Low pressure gas sintering is similar to pressureless sintering with the exception that low over-pressures of the inert gas up to about 150 psig are applied.

Densification of silicon nitride alone normally does not go to completion in the absence of high pressure. For example, the density of the silicon nitride ceramic body might only reach 80 or 90 percent of its theoretical value, whereas a density of 98 percent or more is required in order to achieve a ceramic having excellent mechanical and physical properties, such as high fracture strength and high fracture toughness. In addition, at high temperatures and low pressures silicon nitride decomposes into elemental silicon and nitrogen. Thus, the commercial need for fully densified silicon nitride ceramics having excellent fracture strength and fracture toughness is currently met predominantly by hot pressing or hot isostatic pressing silicon nitride with densification aids.

Disadvantageously, however, the hot pressing and hot isostatic pressing methods require complicated high pressure equipment. Moreover, only a ceramic having a simple shape can be prepared, which must be thereafter diamond ground into a more complicated net shape.

It is known in the art that the sinterability of silicon nitride-based systems is highly sensitive to composition. For example, the composition of the glassy phase critically affects the final sintered density. In addition, the solubility of silicon nitride in the liquid phase and the amount and wettability of the liquid phase all affect the homogeneity and morphology of the finished ceramic, which in turn affect its physical and mechanical properties. As a result it is difficult to prepare by pressureless or low pressure gas sintering a fully densified silicon nitride ceramic body with properties, such as, fracture toughness and fracture strength which meet current commercial needs.

It would be desirable to prepare a fully densified silicon nitride ceramic body by pressureless or low pressure sintering. Such a process would reduce the need for high pressure equipment, eliminate the need for diamond grinding, and readily provide complicated near net shapes in large numbers. In addition, it would be even more desirable if such pressureless or low pressure methods of densification also provided a silicon nitride ceramic body having excellent physical properties, such as, high fracture strength and high fracture toughness.

SUMMARY OF THE INVENTION

In one aspect this invention is a process of preparing a dense, self-reinforced silicon nitride ceramic body by pressureless or low pressure gas sintering. The process comprises subjecting a powder mixture comprising:

(a) silicon nitride in an amount sufficient to provide a ceramic body;

(b) magnesium oxide in an amount sufficient to promote densification of the powder;

(c) yttrium oxide in an amount sufficient to promote the essentially complete conversion of the starting silicon nitride to β-silicon nitride;

(d) a catalytic amount of zirconium oxide; and (e) optionally, one whisker growth enhancing compound in an amount sufficient to promote the formation of β-silicon nitride whiskers, said compound being an oxide selected from the group consisting of calcium, tantalum, gallium, hafnium and indium;

to a pressure in the range from about 1 atmosphere to about 100 atmospheres and to conditions of temperature sufficient to provide for densification to a value which is at least 98 percent of theoretical. In addition, the conditions of temperature and pressure are sufficient to provide in situ formation of β-silicon nitride whiskers having a high average aspect ratio. For the purposes of this invention a "high" average aspect ratio means an average aspect ratio of at least about 2.5. In this manner a dense, self-reinforced silicon nitride ceramic body having a toughness greater than about 37 kg/mm, as measured by the Palmqvist technique described hereinafter, is formed.

Advantageously, the process of this invention provides a nearly fully densified or fully densified silicon nitride ceramic body by pressureless or low pressure gas sintering. By "nearly fully densified" it is meant that the density of the sintered body is at least 98 percent of the theoretical value. By "fully densified" it is meant that the density of the sintered body is at least 99.5 percent of the theoretical value. More advantageously, the pressureless process of this invention reduces the need for high pressure equipment, eliminates the need for diamond grinding, and readily provides complicated near net shapes in large numbers.

In a second aspect, this invention is a silicon nitride ceramic body having a density which is at least about 98 percent of the theoretical value and a toughness greater than about 37 kg/mm, as measured by the Palmqvist technique described hereinbelow. This silicon nitride comprises:

(a) a crystalline phase of β-silicon nitride of which at least about 20 volume percent, as measured by viewing one plane of the silicon nitride ceramic body by scanning electron microscopy, is in the form of whiskers having an average aspect ratio of at least about 2.5;

(b) a glassy grain boundary phase, in an amount ranging from about 2 weight percent to about 10 weight percent of the total weight, comprising magnesium oxide, yttrium oxide, silica, and zirconia, and optionally, one oxide selected from the group consisting of calcium oxide, gallium oxide, hafnium oxide and indium oxide;

(c) a second crystalline phase comprising zirconia, in an amount ranging from about 0.2 weight percent to about 3.0 weight percent of the total weight; and (d) optionally, at least one crystalline phase comprising metal zirconium silicide and/or metal zirconium silicon nitride, in an amount ranging from about 0.1 weight percent to about 3.0 weight percent, wherein the metal is selected from the group consisting of tantalum, calcium, gallium, hafnium and indium, and wherein when the metal is calcium, gallium, hafnium or indium, the same metal occurs as the oxide in the glassy phase (b) hereinabove.

In a third aspect, this invention is a cutting tool comprising the above-identified silicon nitride ceramic body.

Unexpectedly, the silicon nitride ceramic body of this invention exhibits a significantly higher fracture toughness than the monolithic or whisker-reinforced silicon nitride ceramics of the prior art. Moreover, if the fracture toughness of the silicon nitride ceramic of this invention is normalized with respect to density, the normalized fracture toughness and fracture strength are among the highest known for any ceramic material. Advantageously, the silicon nitride ceramic body of this invention is self-reinforced. More advantageously, the process for preparing the novel, whisker-reinforced silicon nitride ceramic body of this invention is reproducible, amenable to industrial scale-up, and less expensive than processes using silicon carbide whisker reinforcement.

DETAILED DESCRIPTION OF THE INVENTION

The silicon nitride starting material used in preparing the ceramic body of this invention can be any silicon nitride powder, including the crystalline forms of α-silicon nitride and β-silicon nitride, or noncrystalline amorphous silicon nitride, or mixtures thereof. Preferably, the silicon nitride powder is predominately in the alpha crystalline form or the amorphous form, or mixtures thereof. More preferably, the starting silicon nitride is predominately in the alpha crystalline form. It is also advantageous if the preferred starting powder possesses a high α/β weight ratio. Preferably, the starting powder contains no greater than about 20 weight percent β-silicon nitride; more preferably, no greater than about 10 weight percent β-silicon nitride; most preferably, no greater than about 6 weight percent β-silicon nitride.

Generally, the higher the purity of the starting silicon nitride powder, the better will be the properties of the finished ceramic body. Depending on the source, however, the silicon nitride powder may contain nonmetallic impurities. Some impurities may be tolerated in the powder, although it is preferred to minimize these as much as possible. Carbon, for example, which is likely to form silicon carbide during sintering, is tolerable in small amounts. Oxygen is present to some extent in the form of silica, $SiO_2$, which usually is found as a coating on the surface of the silicon nitride particles. The amount of silica varies according to the purity of the starting silicon nitride powder and its method of manufacture. Typically, the concentration of silica, introduced naturally through the silicon nitride powder, ranges from about 1.0 to about 5.0 weight percent, based on the total weight of the powder mixture, and preferably from about 3.0 weight percent to about 4.0 weight percent.

The silicon nitride starting powder can be of any size or surface area provided that the dense, self-reinforced ceramic body of this invention is obtained by pressureless or low pressure gas sintering. Large particles having an average diameter in the range from about 15 μm to about 50 μm, for example, may be in the form of hard agglomerates which cannot be easily broken. Powders containing such agglomerates make poor ceramics. On the other hand, very fine powders having an average diameter less than about 0.1 μm are difficult to obtain uniformly and to process. Preferably, the particles have an average diameter in the range from about 0.2 μm to about 10.0 μm; more preferably, from about 0.2 μm to about 3.0 μm. Preferably, the surface area of the silicon nitride particles is in the range from about 5 $m^2/g$ to about 15 $m^2/g$, as determined by the Brunauer-Emmett-Teller (BET) method of measuring surface area, which is described by C. N. Satterfield in *Heterogeneous Catalysis in Practice*, McGraw-Hill Book Company, 1980, pp. 102–105. More preferably, the surface area is in the range from about 8 $m^2/g$ to about 15 $m^2/g$.

The silicon nitride is present in an amount which is suitably in a range from about 90 weight percent to about 98 weight percent based on the total weight of the powder mixture. The range is preferably from about 90 to about 98 weight percent for low pressure gas sintering, and from about 92 to about 97 weight percent for pressureless sintering. More preferably, the range is about 92 to about 97 weight percent for low pressure gas sintering, and from about 93 to about 96 weight percent for pressureless sintering.

Raw silicon nitride powders cannot be densified to high densities in the absence of densification aids. Thus, a densification aid is admixed with the silicon nitride starting powder in a manner described hereinbelow for the purpose of promoting densification of the silicon nitride during processing. Magnesium oxide is suitably employed as the densification aid in the process of this invention. Magnesium containing glass forms a liquid phase at a temperature between about 1300° C. and 1500° C. into which the α-silicon nitride dissolves. The rate of mass transport of the α-silicon nitride is usually quite rapid in the magnesium-based liquid phase, thus the silicon nitride density increases.

Any amount of magnesium oxide is acceptable which produces by pressureless or low pressure gas sintering the dense, self-reinforced silicon nitride ceramic body of the invention. Magnesium oxide is suitably present in an amount in the range from about 0.5 to about 3.0 weight percent based on the total weight of the powder mixture. Preferably, magnesium oxide is present in an amount in the range from about 0.7 weight percent to about 2.5 weight percent and more preferably, from about 0.9 weight percent to about 2.0 weight percent.

In addition to a densification aid, the powder mixture contains a conversion aid. Yttrium oxide is suitably employed as the conversion aid in the process of this invention. The conversion aid at first forms a glassy grain boundary phase through which mass transport is, in general, considerably slower than in the densification aid. Thus, α-silicon nitride dissolves in the conversion aid on heating, but is not readily densified. Advantageously, however, the conversion aid promotes the rapid, essentially complete conversion of α-silicon nitride to β-silicon nitride. This conversion is most desirable because the β-silicon nitride in the form of elongated, single crystal whiskers or grains is responsible for the high fracture toughness and high fracture strength of the silicon nitride ceramic body of this invention. All references hereinafter to silicon nitride whiskers, single crystal whiskers and single crystal silicon nitride whiskers are intended to be synonymous and may be used interchangeably.

Any amount of yttrium oxide can be employed in the starting powder providing the quantity is sufficient to cause the essentially complete conversion of the starting silicon nitride to β-silicon nitride, and is sufficient to produce the dense, self-reinforced silicon nitride ceramic body of the invention by pressureless or low pressure gas sintering. Preferably, the amount of yttrium oxide employed is in the range from about 1.0 weight percent to about 6.0 weight percent based on the total weight of the powder mixture. More preferably, the amount of yttria is present in the range from about 2 weight percent to about 4 weight percent.

Surprisingly, the weight ratio of conversion aid ($Y_2O_3$) to densification aid (MgO) has been found to affect (a) the density of the ceramic body, and (b) the fracture toughness of the ceramic body provided that the whisker growth enhancing compound is also present in the powder mixture. Any weight ratio of conversion aid to densification aid is acceptable providing (a) the density achieved is at least 98 percent of theoretical, and (b) the fracture toughness shows an improvement over the fracture toughness value of 5 MPa (m)$^{\frac{1}{2}}$ for nonreinforced, monolithic silicon nitride. Typically, the weight ratio of yttria to magnesia is suitably from about 5:1 to about 1:2. Preferably, the weight ratio is in the range from about 4:1 to about 1:1. In the absence of a whisker growth enhancing compound, the conversion aid/densification aid weight ratio has no significant effect on the fracture toughness.

The third component required to be present in the powder mixture is zirconium oxide which functions in a multi-fold manner. First, zirconium oxide catalyzes the formation of elongated β-silicon nitride whiskers, and in this sense acts similarly to the fourth ingredient, the whisker growth enhancing compound described hereinafter. Second, zirconium oxide acts as a densification aid. Third, the addition of zirconium oxide broadens the compositional range of the invention wherein full density can be achieved. Fourth, zirconium oxide acts as a getter for metallic impurities, thereby cleaning the glassy phase. For example, iron and chromium react with zirconia to form complex structures which separate as crystalline phases. (In the absence of zirconia, metallic impurities remain in the glassy phase thereby lowering the melting point and the fracture strength of the ceramic.) Because such a multiplicity of functions are performed by the zirconium oxide component, it is therefore referred to as a "catalyst" for the purposes of this invention.

Any catalytic amount of zirconium oxide is acceptable provided that the amount is sufficient to achieve the functions noted hereinbefore and sufficient to provide the dense, self-reinforced silicon nitride composition of this invention by pressureless or low pressure gas sintering. The concentration of zirconium oxide suitably ranges from about 0.2 weight percent to about 5.0 weight percent based on the total weight of the powder mixture. Preferably, the concentration of zirconium oxide ranges form about 0.5 weight percent to about 1.0 weight percent.

U.S. Pat. No. 4,891,342 teaches that zirconia is converted on sintering in a nitrogen atmosphere to zirconium nitride, whose presence in a silicon nitride ceramic disadvantageously lowers its high temperature physical properties. The lowering is related to the reconversion of zirconium nitride to zirconium oxide in an oxidizing atmosphere accompanied by an increase of about 30 percent in the volume of the ceramic. Therefore, sintered bodies containing zirconium nitride are easily cracked. Unexpectedly, it has now been discovered in the process of this invention that zirconium oxide is stabilized by the glass formed from magnesia, yttria, silica, and the aforementioned optional oxides, and therefore essentially no undesirable zirconium nitride is formed during the sintering process of this invention. Consequently, the composition of this invention possesses excellent physical properties, specifically fracture strength and fracture toughness.

The magnesium oxide to zirconia weight ratio may be any which produces the dense, self-reinforced silicon nitride composition of this invention. This weight ratio is suitably in the range from about 15:1 to about 1:10, and preferably, in the range from about 10:1 to about 1:1, more preferably, in the range from about 5:1 to about 1:1.

The fourth component, which may optionally be present in the powder mixture, is a whisker growth enhancing compound. This compound helps to provide a ceramic body of superior fracture toughness and fracture strength. Just how the whisker growth enhancing compound contributes to the excellent physical properties which are observed in the silicon nitride ceramic body of this invention is not completely understood. It is possible that the whisker growth enhancing compound improves the viscosity of the glassy phase thereby facilitating the nucleation of elongated whiskers or grains of β-silicon nitride; the latter being primarily responsible for the improved fracture toughness. The aforementioned theory is presented with the understanding that such a theory is not to be binding or limiting of the scope of the invention.

Any amount of the whisker growth enhancing compound in the starting powder is acceptable providing the amount is sufficient to promote the formation of β-silicon nitride whiskers, described hereinbelow, and sufficient to produce the dense, self-reinforced silicon nitride ceramic body of this invention by pressureless or low pressure gas sintering. Preferably, the amount of the compound employed is in the range from about 0.01 weight percent to about 3.0 weight percent, based on the total weight of the powder mixture. More preferably, the amount of whisker growth enhancing compound is in the range from about 0.1 weight percent to about 1.0 weight percent, most preferably, from about 0.15 weight percent to about 0.5 weight percent.

In U.S. Pat. No. 4,883,776, the presence of calcium, particularly calcium oxide, was found to provide advantages as a whisker growth enhancing compound when silicon nitride powder compositions were hot-pressed into finished ceramic bodies. Calcium oxide is also beneficially employed in the pressureless sintering or low pressure gas sintering processes of this invention. Silicon nitride powders doped with calcium oxide ranging from 0.01 weight percent to about 3.0 weight percent are found to be desirable. It is believed that commercial silicon nitride powders contain only 100 ppm or less of calcium oxide.

Elements other than calcium also promote growth of β-silicon nitride whiskers and provide by pressureless sintering or low pressure gas sintering silicon nitride ceramic bodies having a fracture toughness greater than about 37 kg/mm, as measured by the Palmqvist technique. Satisfactory results are obtained with tantalum oxide, hafnium oxide, gallium oxide, and indium oxide, also in amounts ranging from 0.01 weight percent to about 3.0 weight percent.

It is desirable to use whisker growth enhancing compounds and oxides of magnesium, yttrium, and zirconium in the form of powders which are pure and sufficiently small in size. Purity is not typically a problem, because commercially available materials used as whisker growth enhancing compounds, densification aids and conversion aids, particularly the oxide powders, generally contain less than 20 ppm each of assorted impurities. These levels of impurities are tolerable. Larger amounts of impurities, as for example in the 0.5 weight percent range, are not recommended as they may cause a change in the final ceramic composition and properties. A small powder particle size is favored, because dispersion is enhanced by smaller particles. Preferably, the oxide powders have an average particle size no greater than about 5 μm in diameter.

In the process of this invention, it is required to mix the starting silicon nitride powder, described hereinabove, with a combination of the densification aid, conversion aid, zirconium oxide catalyst, and optionally a whisker growth enhancing compound to obtain a powder mixture which is used in preparing the densified, tough silicon nitride ceramic body of this invention. Ordinarily, the total quantity of magnesium oxide, yttrium oxide, zirconium oxide, and optionally, whisker growth enhancing compound is no greater than about 10 weight percent of the total weight of the powder mixture. The total quantity will depend, however, on probable end use applications for sintered ceramics prepared from the powder mixture. Preferably, however, the total quantity is in the range from about 3 weight percent to about 7 weight percent.

The preparation of the powder mixture containing silicon nitride, magnesium oxide, yttrium oxide, zirconium oxide, and optionally a whisker growth enhancing compound is accomplished in any suitable manner. Ball-milling of the components in powder form is one acceptable manner of preparation. Alternatively, powdered zirconia need not be added to the powder mixture, but can be obtained from the use of zirconia balls during attritor mixing of the other powder components.

The preferred method of preparing the powder mixture comprises use of an attrition mixer with zirconia balls to prepare a finely-divided suspension of silicon nitride and a powdered combination of the densification aid, the conversion aid, zirconia, and the whisker growth enhancing compound in a carrier medium, drying an admixture of the suspension and the attritor balls, beneficially after removing, by filtration or otherwise, excess carrier medium, and thereafter separating the attritor balls to obtain the powder mixture.

The preparation of the finely-divided suspension of silicon nitride and the combination of the densification aid, the conversion aid, zirconia, and the whisker growth enhancing compound in a carrier medium requires no particular order of addition of the components. For example, it is possible to add the powdered combination or powdered components thereof to a colloidal suspension of silicon nitride in a carrier medium or vice versa. Alternatively, all components of the powder mixture may be added simultaneously to the carrier medium prior to attritor milling. The latter method is preferred, particularly when an organic carrier medium is employed.

The carrier medium may be any inorganic or organic compound which is a liquid at room temperature and atmospheric pressure and in which ceramic powders can be dispersed. Examples of suitable carrier media include water; alcohols, such as methanol, ethanol and isopropanol; ketones, such as acetone and methyl ethyl ketone; aliphatic hydrocarbons, such as pentanes and hexanes; and aromatic hydrocarbons, such as benzene and toluene. The carrier medium is desirably an organic liquid, preferably an alcohol such as methanol. The function of the carrier medium is to impart a viscosity suitable for mixing to the solid powders. Any quantity of carrier medium which achieves this purpose is sufficient and acceptable. Preferably, a quantity of carrier medium is employed such that the solids content is in the range from about 15 volume percent to about 40 volume percent. More preferably, a quantity of carrier medium is employed such that the solids content is in the range from about 20 volume percent to about 30 volume percent. Below the preferred lower limit the viscosity of the solid suspension may be too low and the deagglomeration mixing may be ineffective. Above the preferred upper limit the viscosity may be too high, and the deagglomeration mixing may be difficult.

The components of the powdered combination are added to the carrier medium in any manner which gives rise to a finely dispersed suspension of the components. Typically, the process is conducted in a large vessel at room temperature (taken as 23° C.) under air with vigorous stirring. Any common stirring means is suitable, such as a ball-milling device or an attrition mixer. An ultrasonic vibrator may be used in a supplementary manner to break down smaller agglomerates. The attrition mixer is preferred.

To aid in the dispersion of components of the powder mixture, optionally one or more surfactants or dispersants can be added to the suspension. The choice of surfactant(s) or dispersant(s) can vary widely as is well-known in the art. When using an alcohol such as methanol, a dispersant such as a polyethyleneimine may be used to facilitate mixing and a flocculant such as oleic acid may be used to ease recovery of the powder mixture.

Any amount of surfactant or dispersant is acceptable providing dispersion of powder mixture components is improved. Typically, the amount of surfactant is in the range from about 0.01 to 1.0 weight percent of the powder mixture.

The finely-divided suspension is now ready for processing into greenware. For example, the suspension can be slip-cast by techniques well-known in the art for eventual sintering. Alternatively, the suspension can be dried into a powder, ground, and poured into a mold of the desired shape. Drying is accomplished by standard drying means, such as by spray-drying or oven drying under a nitrogen purge. Preferably, drying of the admixture of the powder mixture and the attritor balls is accomplished in an oven under a nitrogen purge after removal of excess carrier medium. During the drying process, additional free carrier medium is removed. The temperature of the drying depends on the boiling point of the carrier medium employed. Typically, the drying process is conducted at a temperature just below the boiling point of the carrier medium under atmospheric pressure. Preferably, the carrier medium is methanol and the temperature of drying is about 60° C. After drying, the resulting powder is separated from the attritor balls and sieved through a screen to obtain a powder having a maximum agglomerate diameter of about 100 $\mu$m. The screen size is usually less than about 60 mesh (250 $\mu$m); more preferably, less than about 80 mesh (180 $\mu$m). The powder which is obtained on sieving is the powder mixture which is used in the pressureless or low pressure gas sintering process of this invention.

After preparing the dried powder mixture, it is then dry pressed at room temperature into the desired greenware in near net shape. Any dry pressing equipment is suitable, such as a hydraulic press having a ram moving uniaxially and perpendicular to the die plates or any common isostatic press. Thereafter, the compacted powder is removed from the dry pressing equipment and is pressureless sintered or low pressure gas sintered in accordance with the process of this invention.

Any standard equipment suitable for pressureless sintering or low pressure gas sintering is acceptable provided that the dense, self-reinforced silicon nitride ceramic of this invention is formed. Typically, the compacted powder is placed into a graphite crucible which is positioned in a silicon nitride powder bed, or preferably, a powder bed of the same composition as the powder mixture. The bed is maintained under an inert atmosphere, preferably nitrogen gas, to prevent the oxidation and decomposition of silicon nitride at high temperatures. The inert atmosphere may be static or flowing, preferably static. If a flow is employed, then it is suitably very low, for example in the range from about 0.01 l/min to about 0.1 l/min. Typically, the pressure during sintering ranges from about 1 atmosphere (atm) to about 100 atm. Preferably, the pressure ranges from about 1 atm to about 10 atm. More preferably, the pressure is about 1 atm. At atmospheric pressure (1 atm), the process is referred to as "pressureless sintering." At superatmospheric pressures ranging up to about 10 atm, or at most 100 atm, the process is referred to as "low pressure gas sintering."

Any sintering temperature will suffice provided that the dense, self-reinforced silicon nitride ceramic of this invention is formed. Typically, however, the temperature must be carefully controlled, because the elongated $\beta$-silicon nitride whiskers are found to form in a narrow temperature range and because the silicon nitride is prone to decompose at high temperatures and low pressures. Preferably, the temperature is maintained in a range from about 1650° C. to about 1825° C., more preferably, from about 1700° C. to about 1750° C. Below the preferred lower temperature limit, the formation of elongated $\beta$-silicon nitride whiskers may be retarded. Above the preferred upper temperature limit, the silicon nitride may decompose. It is noted that the accurate measurement of high temperatures, such as those quoted hereinabove, is technically difficult. Some variation in the preferred temperature range may be observed depending on the method employed in measuring the temperature. The preferred temperatures of this invention are measured by use of a tungsten-rhenium thermocouple, obtained from and calibrated by the Omega Company.

The amount of time that the greenware is sintered will depend upon the specific powder composition, but should be sufficient to bring the greenware to nearly full or full densification. For the purposes of this invention, "nearly full densification" refers to a density which is at least 98 percent of the theoretical value, whereas "full densification" refers to a density which is at least 99.5 percent of the theoretical value. Typically, it takes from about 2 hours to about 3 hours to heat the sample up to the sintering temperature. At the desired temperature the sample is sintered for a time preferably in the range from about 3 hours to about 36 hours, and more preferably, from about 12 hours to about 15 hours. Afterwards, the sample is cooled to room temperature over a period of about 2 hours.

The pressureless sintering and low pressure gas sintering methods, described hereinbefore, allow for the formation of silicon nitride ceramic articles which can be used as cutting tools. A variety of shapes, such as, flat plates or tubes can be prepared. These plates may range in size from about 6 inches in length by about 6 inches in width by about 0.7 inch in thickness to about 16 inches (40.6 cm) in length by about 16 inches (40.6 cm) in width by about 1.0 inch (2.5 cm) in thickness. Smaller and larger plates can also be fabricated, as determined by the size of the compacting plaques. Tubes may range from about 4 inches in length by about 0.5 inch in diameter to about 8 inches in length by about 1.5 inches in diameter. Cutting tools can be fabricated by slicing and grinding these plates and tubes into a variety of cutting tool shapes, but typically, the pressureless and low pressure sintering methods of this invention allow for formation of near net shapes.

The silicon nitride ceramic body which is produced by the process of this invention is a dense material having no significant porosity. Preferably, densification proceeds to greater than 98 percent of the theoretical value, more preferably, to greater than 99 percent of the theoretical value, most preferably, to greater than 99.5 percent of the theoretical value. Those skilled in the art will recognize that the theoretical density will vary depending upon the composition of the ceramic. As measured by X-ray diffraction the silicon nitride is present in the beta crystalline form, indicating essentially complete alpha to beta conversion during processing. Quite unexpectedly, the $\beta$-silicon nitride is present predominately as single crystal, "needle-like" whiskers or elongated grains, as determined by both scanning electron microscopy (SEM) and transmission electron microscopy (TEM). The size of the hexagonal $\beta$-silicon nitride grains is usually in the range from about 1 $\mu$m to about 20 $\mu$m in length with a mean diameter of from about 0.2 $\mu$m to about 1.5 $\mu$m; preferably from about 3 $\mu$m to about 10 $\mu$m in length with a mean diameter from about 0.3 $\mu$m to about 1.0 $\mu$m.

Since the whiskers are oriented randomly, it is difficult to determine exactly the percentage of silicon nitride which exists as whiskers, as opposed to equiaxed particles. The measurement is made by viewing one plane of the silicon nitride ceramic in a scanning electron microscope (SEM) and measuring the percentage by volume occupied by whiskers having an aspect ratio between 2 and 16. It is observed that the whiskers are homogeneously distributed and randomly oriented throughout the ceramic body, and that the volume occupied by the whiskers is approximately the same in all planes. Typically, the percentage of silicon nitride whiskers having an aspect ratio of between 2 and 16 is at least about 20 volume percent as measured in a plane. Preferably, the percentage of silicon nitride whiskers having an aspect ratio between 2 and 16 is at least about 35 volume percent as measured in a plane. Unexpectedly, the whiskers are found to have a high average aspect ratio. Typically, the average aspect ratio of the silicon nitride whiskers is at least about 2.5; preferably, at least about 4.0. It is noted that because the aspect ratio is measured in a plane, the average aspect ratio is a lower bound. For example, a whisker which is perpendicular to the plane may have an apparent aspect ratio of less than 2; whereas the true aspect ratio may be very much greater than 2.

In addition to the silicon nitride crystalline phase, the composition of this invention contains a glassy grain boundary phase in an amount ranging from about 2 weight percent to about 10 weight percent of the total weight of the ceramic. Preferably, the glassy phase is present in an amount ranging from about 5 weight percent to about 7 weight percent of the total weight. The glassy phase comprises magnesium oxide, yttrium oxide, silica and zirconia. The amount of zirconia may range from traces to a significant portion of all of the zirconia available. Optionally, the glassy phase may also contain one additional oxide selected from the group consisting of calcium oxide, gallium oxide, hafnium oxide and indium oxide.

Additionally, the composition of this invention contains a second crystalline phase in an amount suitably ranging from about 0.5 weight percent to about 5.0 weight percent of the total weight of the ceramic. The second crystalline phase is zirconium oxide. One or two other crystalline phases may be present in a combined amount totaling not more than about 3.0 weight percent. Specifically, these other crystalline phases comprise metal zirconium silicide and/or metal zirconium silicon nitride, wherein the metal is selected from the group consisting of tantalum, calcium, gallium, hafnium and indium. When the metal is calcium, gallium, hafnium or indium, the same metal occurs in the glassy phase as the metal oxide. When the metal is tantalum, the glassy phase does not contain a detectable amount of tantalum oxide.

Specific compositions covered by this invention comprise the aforementioned beta-silicon nitride crystalline phase and further comprise a glassy phase and additional crystalline grain boundary phases selected from one of the following group:

(A) A glassy grain boundary phase containing magnesium oxide, yttrium oxide, silica, and zirconia; a second crystalline phase of zirconia; and no metal zirconium silicide or metal zirconium silicon nitride phases being present;

(B) A glassy grain boundary phase containing magnesium oxide, yttrium oxide, silica and zirconia; a second crystalline phase of zirconia; and one or two additional phases selected from the group consisting of tantalum zirconium silicide and tantalum zirconium silicon nitride;

(C) A glassy grain boundary phase containing magnesium oxide, yttrium oxide, silica, zirconia and calcium oxide; a second crystalline phase of zirconia; and one or two additional phases selected from the group consisting of calcium zirconium silicide and calcium zirconium silicon nitride;

(D) A glassy grain boundary phase containing magnesium oxide, yttrium oxide, silica, zirconia and gallium oxide; a second crystalline phase of zirconia; and one or two additional phases selected from the group consisting of gallium zirconium silicide and gallium zirconium silicon nitride;

(E) A glassy grain boundary phase containing magnesium oxide, yttrium oxide, silica, zirconia and hafnium oxide; a second crystalline phase of zirconia; and one or two additional phases selected from the group consisting of hafnium zirconium silicide and hafnium zirconium silicon nitride; and (F) A glassy grain boundary phase containing magnesium oxide, yttrium oxide, silica, zirconia and indium oxide; a second crystalline phase of zirconia; and one or two additional phases selected from the group consisting of indium zirconium silicide and indium zirconium silicon nitride.

Preferably, the composition comprises the aforementioned beta-silicon nitride crystalline phase, a glassy grain boundary phase containing magnesium oxide, yttrium oxide, silica and zirconia; a second crystalline phase of zirconia; and one or two additional phases selected from the group consisting of tantalum zirconium silicide and tantalum zirconium silicon nitride.

The mechanical properties of the self-reinforced silicon nitride ceramic body are readily measured by use of standard tests. In particular, fracture toughness ($K_{IC}$) is measured according to the Chevron notch and the Palmqvist methods described hereinafter. Fracture strength (modulus of rupture) is measured according to the Military Standard 1942b test. Hardness is measured according to the Vickers indentation test.

Fracture strength (modulus of rupture) measures the resistance of the material to fracture under a load. Fracture strength is defined as the maximum unit stress at which fracture occurs. Test bars are prepared by cutting rectangular bars (45 mm×4 mm×3 mm) of the silicon nitride ceramic in a plane perpendicular to the pressing direction. The bars are ground on the surfaces parallel to the pressing plates using a 500 grit grinding wheel (Military Standard 1974). The fracture strength is measured at room temperature and at elevated temperatures using a 4-point bend test with 20 mm span and crosshead speed of 0.5 mm/min. Typically, the fracture strength at room temperature is at least about 95 ksi (650 MPa). Preferably, the fracture strength at room temperature ranges from about 120 ksi (825 MPa) to about 150 ksi (1050 MPa). Typically, at 1200° C. the fracture strength is at least about 65 ksi (450 MPa).

Toughness measures the resistance of the material to fracture under a dynamic load. More specifically, fracture toughness is defined as the maximum amount of energy which a unit volume of material will absorb without fracture. In the present invention two methods are employed to measure fracture toughness. The first of these is the Chevron notch test. Test bars are prepared as described hereinabove, and additionally scored with a Chevron notch. The test bars are then subjected to a 3-point bend test with 40 mm span and crosshead speed of 0.5 mm/min. Typically, the fracture toughness of the silicon nitride ceramic body of this invention, as measured at room temperature (taken as 23° C.) by the Chevron notch technique, is greater than about 6 MPa $(m)^{\frac{1}{2}}$. Preferably, the room temperature fracture toughness is greater than about 7 MPa $(m)^{\frac{1}{2}}$; more preferably, greater than about 8 MPa $(m)^{\frac{1}{2}}$. Most preferably, the room temperature fracture toughness ranges from about 8 MPa $(m)^{\frac{1}{2}}$ to about 11 MPa $(m)^{\frac{1}{2}}$.

In the evaluation of cutting tool materials it is useful to measure the Palmqvist toughness and the Vickers hardness. Both measurements can be made simultaneously on one test sample, and therefore these tests are very convenient.

The Vickers hardness test measures the resistance of the ceramic material to indentation. A sample, approximately 1 cm in length by 1 cm in width by 1 cm in height, is placed on a flat surface, and indented with a standard Vickers diamond indentor at a crosshead speed of 0.02 in/min. The Vickers hardness number is calculated from the applied load, in this case 14 kg, and the cross-sectional area of the indentation. Prior to making the test, the test sample is polished in a special manner. First, the sample is cleaned and rough spots are flattened by use of a 220-grid diamond wheel. Next, a 45-micron diamond wheel is used to start the polishing. Next, the sample is treated to a series of polishings at 30 psi and 200 rpm in the following consecutive manner: three five-minute intervals with 30-micron diamond paste, three five-minute intervals with 15-micron diamond paste, three five-minute intervals with 6-micron diamond paste, two five-minute intervals with 1-micron diamond paste, and one five-minute interval with 0.25-micron diamond paste. Between each interval the sample is thoroughly cleansed by washing with water and sonicating for two minutes. The Vickers hardness number of the silicon nitride ceramic of this invention is at least about 1400 kg/mm² at room temperature. Preferably, the Vickers hardness number ranges from about 1425 kg/mm² to about 1700 kg/mm² at room temperature; more preferably, from about 1550 kg/mm² to about 1700 kg/mm².

The Palmqvist toughness test is an extension of the Vickers test. (See S. Palmqvist in *Jerndontorets Annalen*, 141 (1957), 300, for a description of the Palmqvist toughness test.) The test sample is prepared and indented as in the Vickers test, but the 14-kg load is additionally held for 15 seconds. The sample cracks. The measurements of the indented diagonals and the crack lengths are made on a Nikon UM2 microscope at 1000×magnification. The Palmqvist toughness (W) is directly proportional to the applied load (P) and inversely proportional to the crack length (L). Preferably, the silicon nitride ceramic body of this invention exhibits a Palmqvist toughness at room temperature of at least about 37 kg/mm. Preferably, the silicon nitride ceramic body of this invention exhibits a Palmqvist toughness at room temperature in the range from about 37 kg/mm to about 52 kg/mm; more preferably, from about 40 kg/mm to about 46 kg/mm.

ILLUSTRATIVE EMBODIMENTS

The following examples serve to illustrate the novel dense, self-reinforced silicon nitride composition of this invention and the method of preparing the novel silicon nitride ceramic. The examples are not intended to be limiting of the scope of this invention. All percentages are weight percent unless otherwise noted.

The silicon nitride powder is commercially available from Ube Industries, Ltd. under the trade designation SN-E10 (Lot no. A010061). It contains 1.6 percent oxygen, less than 100 ppm Cl, less than 100 ppm Fe, less than 50 ppm Ca, and less than 50 ppm Al. In addition, the silicon nitride has a crystallinity of greater than 99.5 percent, an alpha-$Si_3N_4$ content greater than 95 percent, and a surface area of 11.2 m²/g. Moly Corp supplies yttria, and Baker Incorporated supplies magnesia and calcia. Zirconia, in the form of zirconia balls, is available from Union Process. Zirconia powder is available from Toyo Soda (type TZ-3Y20A). Tantalum oxide, gallium oxide, hafnium oxide and indium oxide are available from Alfa Products.

EXAMPLE 1

(a) Powder Preparation

A series of dried powder mixtures is prepared according to the following general method: Desired amounts of silicon nitride, magnesia, yttria, and tantalum oxide are mixed in an attritor (Union Process batch attritor, Model 01HD-750 cc capacity with polytetrafluoroethylene coated tube and stirrer) containing zirconia balls with a stirring rate of 350 revolutions per minute (rpm) for a mixing time of 1 hour. hour. Methanol is used as the mixing medium in an amount to provide 20 weight percent solids. After agitation, excess methanol is removed by vacuum filtration. The mixture is then dried under a flow of dry nitrogen gas. After drying, the mixture is separated from the zirconia balls using a 30 mesh stainless steel sieve and subsequently passed through 30 mesh, 40 mesh and 60 mesh stainless steel sieves to provide the dried powder mixtures set forth in Table I.

TABLE I*

| Ex. 1 | % Si$_3$N$_4$ | % MgO | % Y$_2$O$_3$ | % ZrO$_2$ | % Ta$_2$O$_5$ | Y$_2$O$_3$/MgO | MgO/ZrO$_2$ | % Theor. Density |
|---|---|---|---|---|---|---|---|---|
| a | 94.8 | 0.75 | 3.75 | 0.5 | 0.2 | 5:1 | 1.50 | 98.6 |
| b | 94.8 | 1.13 | 3.38 | 0.5 | 0.2 | 3:1 | 2.26 | 100.0 |
| c | 94.8 | 1.60 | 2.90 | 0.5 | 0.2 | 1.8:1 | 3.20 | 100.0 |
| d | 94.8 | 2.25 | 2.25 | 0.5 | 0.2 | 1:1 | 4.50 | 100.0 |
| e | 94.8 | 3.00 | 1.50 | 0.5 | 0.2 | 1:2 | 6.00 | 98.1 |
| f | 94.8 | 3.38 | 1.13 | 0.5 | 0.2 | 1:3 | 6.76 | 97.6 |

*Percentages of components are based on weight percent in the powder mixture. Powder mixtures sintered for 12 hr at 1750° C. and 1 atm.

(b) Dry Pressing and Pressureless Sintering

The dried powder mixtures prepared hereinabove are dry pressed and pressureless sintered according to the following general procedure: A sample of the dried powder mixture (80 g) is poured into a stainless steel die 2 inches in diameter by 0.5 inch in thickness. The powder is dry pressed at room temperature under a pressure of 5 psi to form a disc having a density of about 49–50 percent of the theoretical value. The disc is then isostatically pressed at room temperature under a pressure of 45 ksi to achieve a density of about 55 percent of theoretical. The resulting pressed disc is placed in a graphite crucible, and the crucible is placed in a silicon nitride powder bed of the same composition as the compacted powder mixture. The disc is thereafter sintered for 12 hours in a 4 inch ASTRO graphite furnace at 1750° C. under a static nitrogen atmosphere of 1 atm pressure.

The density of the silicon nitride ceramic discs, prepared hereinabove, is measured by the water immersion method, as described in "Modern Ceramic Engineering" by D. W. Richerson, Marcel Dekker, 1982, and by stereology analysis from SEM photomicrographs with the results shown in Table I. It is seen that the powder compositions of Example 1 comprising silicon nitride, magnesium oxide, yttrium oxide, zirconium oxide and tantalum oxide can be pressureless sintered to form ceramic bodies having densities at least about 98 percent of theoretical.

(c) Phases and Morphology

A dried powder mixture is prepared as described hereinabove containing 94.8 percent silicon nitride, 2.9 percent yttrium oxide, 1.6 percent magnesium oxide, 0.17 percent tantalum oxide, and 0.52 percent zirconium oxide. The powder is dry pressed and pressureless sintered to achieve a ceramic having a density which is 100 percent of the theoretical value. Silicon nitride is present essentially in the $\beta$ crystalline phase, as determined by X-ray diffraction. The microstructure of the ceramic is determined by scanning electron microscopy (SEM), as viewed in a plane. About 35 volume percent of the silicon nitride appears in the form of elongated whiskers or grains having an average diameter between 0.5 $\mu$m and 1.0 $\mu$m and having an average aspect ratio above 2.5.

The bulk chemical composition of the ceramic is determined by neutron activation analysis, and is found to contain about 92 percent silicon nitride, about 6 percent glassy grain boundary phase, and about 2 percent other crystalline phases. The glassy grain boundary phase has an average glass composition, as measured by TEM, as follows: 47±10 percent yttrium oxide, 32±11 percent silica, 17±4 percent magnesia, and 4 percent nitrogen. Traces of calcium oxide impurity, coming from the magnesium oxide, and traces of zirconium oxide were detected in the glassy grain boundary phase. A second crystalline phase of zirconium oxide is found in a concentration of 0.1 percent based on total weight. In addition, two minor crystalline phases comprising zirconium tantalum silicide and zirconium tantalum silicon nitride are found in a total concentration of 2.0 percent based on total weight.

At room temperature the ceramic has a fracture toughness, as measured by the Palmqvist technique, of 43.3 kg/mm; a K$_{IC}$ fracture toughness, as measured by the Chevron test, of 7.8 MPa·m$^{\frac{1}{2}}$; a fracture strength of 120 ksi (827 MPa); and a Vickers hardness of 1550 kg/mm$^2$. At 1200° C. the fracture strength is 79 ksi (543 MPa).

EXAMPLE 2

A silicon nitride powder mixture containing silicon nitride, magnesium oxide, yttrium oxide, zirconium oxide, and tantalum oxide is prepared and pressureless sintered as in Example 1(c), with the exception that the die is in the form of a plate having the dimensions 7 inches in length by 7 inches in width by 1.1 inch in thickness. A ceramic body is obtained having a density which is 99.99 percent of the theoretical value. In addition, the ceramic contains elongated grains of $\beta$-silicon nitride having an average aspect ratio about 2.5, a second crystalline phase of zirconium oxide, two minor crystalline phases comprising tantalum zirconium silicide and tantalum zirconium silicon nitride, and a glassy grain boundary phase containing magnesium oxide, yttrium oxide, and silica. It is seen that the powder composition of Example 1(c) can be pressureless sintered into large, fully densified ceramic plates.

EXAMPLE 3

A silicon nitride powder mixture containing 94.8 percent silicon nitride, 2.9 percent yttrium oxide, 1.6 percent magnesium oxide, 0.5 percent zirconium oxide, and 0.2 percent tantalum oxide is prepared and dry pressed into discs as described in Example 1. The discs are pressureless sintered under 1 atmosphere of flowing nitrogen with the results shown in Table II.

TABLE II*

| Ex. 3 | Temp. °C. | % Theoretical Density | | | |
|---|---|---|---|---|---|
| | | 6 hr | 12 hr | 18 hr | 24 hr |
| a | 1700 | 98.7 | 99.7 | 100.0 | 100.0 |
| b | 1725 | 99.9 | 100.0 | 100.0 | 100.0 |
| c | 1750 | 100.0 | 100.0 | 100.0 | 100.0 |
| d | 1800 | 99.6 | 99.5 | 99.1 | 98.7 |
| e | 1825 | 95.2 | 94.7 | — | — |

*Samples heated over a 2 hr period to the sintering temperature, sintered under 1 atm flowing N$_2$ at temperature and time shown, and cooled to room temperature over a period of 1.5 hours.

It is seen that the silicon nitride powder composition of Example 3 can be pressureless sintered into ceramic bodies having densities of at least 98 percent of theoretical. The operative sintering temperature ranges between 1700° C. and 1800° C. Palmqvist toughness values ranging between 38 kg/mm and 45 kg/mm and Vickers hardness values ranging between 1420 kg/mm² and 1580 kg/mm² are observed.

EXAMPLE 4

A powder mixture is prepared according to the procedure of Example 1, with the exception that the composition comprises 95.8 percent silicon nitride, 2.3 percent yttria, 1.3 percent magnesia, 0.5 percent zirconia and 0.1 percent calcium oxide. The powder mixture is dry pressed into discs which are pressureless sintered at a variety of sintering temperatures and times, as in Example 1. The resulting densities are set forth in Table III.

TABLE III*

| Ex. 4 | Temp. °C. | % Theoretical Denisty | | | |
|---|---|---|---|---|---|
| | | 6 hr | 12 hr | 18 hr | 24 hr |
| a | 1700 | — | 93.2 | 97.9 | 98.6 |
| b | 1725 | — | 98.6 | 100.0 | 100.0 |
| c | 1750 | 93.2 | 98.1 | 98.3 | 98.6 |
| d | 1800 | 94.1 | 96.2 | 96.0 | — |
| e | 1825 | 89.1 | — | — | — |

*Samples heated over a 2 hr period to the sintering temperature, sintered under 1 atm flowing N₂ at temperature and time shown, and cooled to room temperature over a period of 1.5 hours.

It is observed that the powder compositions of Example 4 can be pressureless sintered into ceramic bodies having full densification. The optimum sintering conditions comprise a temperature in the range from about 1700° C. to about 1750° C. and sintering time of at least about 12 hours, and preferably, at least about 18 hours. X-ray diffraction indicates that α-silicon nitride is completely converted to β-silicon nitride, the latter forming elongated grains with average diameter of about 0.7 μm. The Palmqvist toughness, measured at room temperature, of samples E-4(a-e) is about 41 kg/mm, while the measured Vickers hardness falls in the range from about 1450 kg/mm² to about 1500 kg/mm².

EXAMPLE 5

A series of powder mixtures is prepared as in Example 1, with the exception that the composition comprises 95.3 percent silicon nitride, 2.9 percent yttria, 1.6 percent magnesia, 0.2 percent tantalum oxide, and a concentration of zirconia as shown in Table IV.

TABLE IV

| Ex. 5 | Wt. % ZrO₂ | % Theoretical Density |
|---|---|---|
| a | 0 | 98.1 |
| b | 0.1 | 98.5 |
| c | 0.2 | 99.2 |
| d | 0.5 | 99.6 |
| e | 1.0 | 99.7 |
| f | 2.0 | 99.8 |
| g | 5.0 | 99.1 |

The powder mixtures are pressed into discs and pressureless sintered at 1750° C. for 12 hours as in Example 1 with the results set forth in Table IV. It is seen that silicon nitride ceramic bodies having a sintered density of at least about 98 percent of theoretical are prepared by pressureless sintering the powder mixtures of Example 5. Moreover, it is observed that zirconia is required in an amount ranging from 0.2 percent to 0.5 percent in order to achieve a sintered density above 99.0 percent of theoretical.

EXAMPLE 6

A powder mixture is prepared, according to the procedure of Example 1, having a composition comprising silicon nitride (94.8 percent), yttria (2.9 percent), magnesia (1.6 percent), zirconia (0.5 percent) and indium oxide (0.2 percent). The powder is pressureless sintered at 1750° C. for 12 hours. A silicon nitride ceramic body is obtained having a sintered density of 99.7 percent of the theoretical value and having at room temperature a fracture strength of 115 ksi (793 MPa), a Vickers hardness of 1580 kg/mm², and a Palmqvist toughness of 41.2 kg/mm.

EXAMPLE 7

A powder mixture is prepared, according to the procedure of Example 1, having a composition comprising silicon nitride (94.8 percent), yttria (2.9 percent), magnesia (1.6 percent), zirconia (0.5 percent) and gallium oxide (0.2 percent). The powder is pressureless sintered at 1750° C. for 12 hours. A silicon nitride ceramic body is obtained having a sintered density of 100.0 percent of theoretical and having at room temperature a Palmqvist toughness of 40.2 kg/mm, a Vickers hardness of 1575 kg/mm², and a fracture strength of 120 ksi (827 MPa).

EXAMPLE 8

A powder mixture is prepared, according to the procedure of Example 1, with a composition comprising silicon nitride (94.8 percent), yttria (2.9 percent), magnesia (1.6 percent), zirconia (0.5 percent) and hafnium oxide (0.2 percent). The powder is pressureless sintered at 1750° C. for 12 hours. A silicon nitride ceramic body having a sintered density of 98.1 percent of theoretical is obtained.

What is claimed is:

1. A process of preparing a dense, self-reinforced silicon nitride ceramic body by pressureless or low pressure gas sintering, the process comprising subjecting a powder mixture comprising:
   (a) silicon nitride in an amount sufficient to provide a ceramic body;
   (b) magnesium oxide in an amount sufficient to promote densification of the powder;
   (c) yttrium oxide in an amount sufficient to promote the essentially complete conversion of the starting silicon nitride to β-silicon nitride;
   (d) a catalytic amount of zirconia; and
   (e) one whisker growth enhancing compound in an amount sufficient to promote the formation of β-silicon nitride whiskers, said compound being an oxide selected from the group consisting of calcium oxide, tantalum oxide, gallium oxide, hafnium oxide and indium oxide;
to a pressure in the range from about atmospheric (1 atmosphere) to about 100 atmospheres and to conditions of temperature sufficient to provide for densification to a value which is at least 98 percent of theoretical and sufficient to provide in situ formation of β-silicon nitride whiskers having a high average aspect ratio, such that the ceramic has a toughness greater than about 37 kg/mm, as measured by the Palmqvist technique.

2. The process of claim 1 wherein the amount of silicon nitride ranges from about 90 to about 98 weight percent based on the total weight of the powder mixture.

3. The process of claim 1 wherein the amount of magnesium oxide ranges from about 0.5 to about 3.0 weight percent based on the total weight of the powder mixture.

4. The process of claim 1 wherein the amount of yttrium oxide ranges from about 1.0 to about 6.0 weight percent based on the total weight of the powder mixture.

5. The process of claim 1 wherein the amount of zirconium oxide ranges from about 0.2 to about 5.0 weight percent based on the total weight of the powder mixture.

6. The process of claim 1 wherein the amount of whisker growth enhancing compound ranges from about 0.01 to about 3.0 weight percent based on the total weight of the powder mixture.

7. The process of claim 1 wherein a whisker growth enhancing compound of calcium oxide is employed.

8. The process of claim 1 wherein a whisker growth enhancing compound of tantalum oxide is employed.

9. The process of claim 1 wherein a whisker growth enhancing compound of gallium oxide is employed.

10. The process of claim 1 wherein a whisker growth enhancing compound of hafnium oxide is employed.

11. The process of claim 1 wherein a whisker growth enhancing compound of indium oxide is employed.

12. The process of claim 1 wherein the temperature is in the range from about 1650° C. to about 1825° C.

13. The process of claim 1 wherein the temperature is in the range from about 1700° C. to about 1750° C.

14. The process of claim 1 wherein the yttrium oxide to magnesium oxide weight ratio is in the range from about 5:1 to about 1:2.

15. The process of claim 1 wherein the magnesium oxide to zirconium oxide weight ratio is in the range from about 15:1 to about 1:10.

16. The process of claim 1 wherein an alcoholic carrier medium is employed.

17. The process of claim 1 wherein the pressure is in the range from about 1 atm to about 10 atm.

18. The process of claim 1 wherein the pressure is about 1 atm.

19. A silicon nitride ceramic body having a density which is at least 98 percent of the theoretical value and a toughness greater than about 37 kg/mm, as measured by the Palmqvist technique, comprising:

(a) a crystalline phase of $\beta$-silicon nitride of which at least about 20 volume percent, as measured by viewing one plane of the silicon nitride ceramic body by scanning electron microscopy, is in the form of whiskers having an average aspect ratio of at least about 2.5;

(b) a glassy grain boundary phase, in an amount ranging from about 2 to about 10 weight percent of the total weight, comprising magnesium oxide, yttrium oxide, silica, zirconia, and one oxide selected from the group consisting of calcium oxide, gallium oxide, hafnium oxide and indium oxide;

(c) a second crystalline phase comprising zirconia, in an amount ranging from about 0.5 to about 5.0 weight percent of the total weight; and (d) one or two crystalline phases, in an amount ranging from 0.1 to about 3.0 weight percent, comprising metal zirconium silicide and/or metal zirconium silicon nitride wherein the metal is selected from the group consisting of tantalum, calcium, gallium, hafnium and indium, and wherein when the metal is calcium, gallium, hafnium or indium, the same metal occurs as the oxide in the glassy phase (b) hereinabove.

20. The composition of claim 19 wherein the glassy grain boundary phase contains magnesium oxide, yttrium oxide, silica and zirconia and wherein two additional crystalline phases of tantalum zirconium silicide and tantalum zirconium silicon nitride are present.

21. The composition of claim 19 wherein the glassy grain boundary phase contains magnesium oxide, yttrium oxide, silica, zirconia and calcium oxide, and wherein two additional crystalline phases of calcium zirconium silicide and calcium zirconium silicon nitride are present.

22. The composition of claim 19 wherein the glassy grain boundary phase contains magnesium oxide, yttrium oxide, silica, zirconia and gallium oxide, and wherein two additional crystalline phases of gallium zirconium silicide and gallium zirconium silicon nitride are present.

23. The composition of claim 19 wherein the glassy grain boundary phase contains magnesium oxide, yttrium oxide, silica, zirconia and hafnium oxide, and wherein two additional crystalline phases of hafnium zirconium silicide and hafnium zirconium silicon nitride are present.

24. The composition of claim 19 wherein the glassy grain boundary phase contains magnesium oxide, yttrium oxide, silica, zirconia and indium oxide, and wherein two additional crystalline phases of indium zirconium silicide and indium zirconium silicon nitride are present.

25. The composition of claim 19 wherein the Vickers hardness is at least about 1400 kg/mm$^2$.

26. The composition of claim 19 wherein the flexural strength is at least about 95 ksi (650 MPa).

27. The composition of claim 19 wherein the fracture toughness, as measured by the Chevron technique, is at least about 6 MPa·m$^{\frac{1}{2}}$.

28. A cutting tool prepared from the composition of claim 19.

* * * * *